(12) United States Patent
King et al.

(10) Patent No.: US 10,239,992 B2
(45) Date of Patent: Mar. 26, 2019

(54) CARBON BLACK MODIFIED POLYESTERS

(71) Applicant: International Business Machines Corporation, Armonk, NY (US)

(72) Inventors: Scott B. King, Rochester, MN (US); Brandon M. Kobilka, Tucson, AZ (US); Joseph Kuczynski, North Port, FL (US); Jason T. Wertz, Pleasant Valley, NY (US)

(73) Assignee: International Business Machines Corporation, Armonk, NY (US)

( * ) Notice: Subject to any disclaimer, the term of this patent is extended or adjusted under 35 U.S.C. 154(b) by 0 days.

(21) Appl. No.: 15/446,846

(22) Filed: Mar. 1, 2017

(65) Prior Publication Data

US 2018/0251595 A1  Sep. 6, 2018

(51) Int. Cl.
| | |
|---|---|
| *C08K 3/04* | (2006.01) |
| *C08G 63/91* | (2006.01) |
| *C09C 1/56* | (2006.01) |
| *B29B 11/10* | (2006.01) |
| *B29C 67/24* | (2006.01) |
| *B29K 67/00* | (2006.01) |
| *B29K 105/16* | (2006.01) |
| *B29K 507/04* | (2006.01) |

(52) U.S. Cl.
CPC ............ *C08G 63/912* (2013.01); *B29B 11/10* (2013.01); *B29C 67/24* (2013.01); *C08K 3/04* (2013.01); *C09C 1/56* (2013.01); *B29K 2067/046* (2013.01); *B29K 2105/16* (2013.01); *B29K 2507/04* (2013.01)

(58) Field of Classification Search
CPC ................................ C08G 63/912; C08K 3/04
See application file for complete search history.

(56) References Cited

U.S. PATENT DOCUMENTS

| | | | |
|---|---|---|---|
| 4,994,520 A | * | 2/1991 | Mori ...................... B41M 5/395 524/547 |
| 7,799,424 B2 | | 9/2010 | Mochiduki et al. |
| 8,651,157 B2 | | 2/2014 | Michiels et al. |
| 8,877,338 B2 | | 11/2014 | Dorgan et al. |
| 8,908,258 B2 | | 12/2014 | Kobayashi et al. |
| 9,212,273 B2 | | 12/2015 | Bosnyak et al. |
| 2009/0220693 A1 | | 9/2009 | Takemura et al. |
| 2014/0238255 A1 | | 8/2014 | Sugasaki |
| 2015/0283788 A1 | | 10/2015 | Tsotsis |
| 2016/0122187 A1 | | 5/2016 | Lhost et al. |

OTHER PUBLICATIONS

Wu, Carbon 95 (2015) p. 380-387 (Year: 2015).*
Fu, Polymer 55 (2014) p. 6381-6389 (Year: 2014).*
Wang, Polymer Degradation and Stability 93 (2008) p. 1044-1052 (Year: 2008).*

(Continued)

*Primary Examiner* — Robert C Boyle
(74) *Attorney, Agent, or Firm* — Patterson + Sheridan, LLP (57) ABSTRACT

Embodiments of the disclosure generally provide compositions and methods involving the production of polyester composite materials that contain covalently bonded carbon black particles. The carbon black particles have surface functional groups that enable the grafting of a polyester, and/or initiate the ring opening of a monomer to create a polyester grown from the surface of the particle.

19 Claims, 7 Drawing Sheets

(56) References Cited

OTHER PUBLICATIONS

Lu, Appl. Phys. Lett. 102 (2013) p. 231910-1-231910-4 (Year: 2013).*
Tsubokawa, Polymer Bulletin 10, (1983) p. 63-69 (Year: 1983).*
Taniguchi, Materials Chemistry and Physics 108 (2008) p. 397-402 (Year: 2008).*
Tsubokawa, Applied Polymer Science, 30 (1985) p. 2041-2049 (Year: 1985).*

* cited by examiner

CARBON BLACK MODIFIED POLYESTERS

FIELD

The present disclosure generally relates to polyesters containing carbon black.

BACKGROUND

Modern polymers and thermoplastics are extruded or molded into objects for use in a number of applications in the fields that include consumer, construction, automotive, and aerospace. Organic and inorganic mineral fillers in particle and/or fiber form may be mixed or blended with a polymer to create a polymer composite material which may display new and improved properties such as increased fire retardancy, increased modulus and hardness, thermal and electrical conduction, and a desired coloration. The distribution of the filler material in the polymer host of the composite should be as homogenous as possible so that the composite properties are not compromised or degraded. For example, too high of a weight percent of a filler in the composite, and/or lack of filler homogeneity in the composite, may result in a material that crumbles easily and is not processable into a useful object.

Carbon black (CB) is a filler material that is used to impart dark or black coloration in a polymer, and may also be used to create an electrically conductive polymer composite, such as those found in resettable fuses, and in radio frequency shielding applications. Carbon black is used in a variety of polymers, from olefins to polyesters, but may exhibit phase separation and aggregate formation which can negatively impact the composite properties due to the lack of miscibility of the fillers, and/or affinity for the polymer host. In particular, polyesters suffer from the aforementioned phase separation and segregation phenomena, and in many cases are unable to uptake sufficient useful amounts of CB to achieve the desired polymer composite properties. Therefore, it would be an advantage to have a melt-processable polyester CB composite, such as a polylactic acid (PLA) CB composite, that has improved CB filler/polymer homogeneity, and uses a lower percent by weight loading of CB in the composite to realize desired properties such as coloration.

SUMMARY

Described herein is a polymer composite containing polylactic acid and carbon black particles, wherein the polylactic acid is covalently bonded to the carbon black particles, and wherein the polylactic acid is covalently bonded to the surfaces of the carbon black particles. The carbon black particles that are covalently bonded to the polylactic acid are a reaction product of carbon black particles with surface functional groups and polylactic acid. The carbon black particles may be pendant groups attached to the polylactic acid main chain, or may be end groups attached to the polylactic acid main chain, or both.

The polymer composite of this disclosure contains reaction products that are esterification and transesterification reaction products, and some derived from a lactide ring opening polymerization. The polymer composite further contains carbon black particles that have diameters from 5 nm to 750 nm, and carbon black particles which are not covalently bonded to the polylactic acid, in addition to the covalently bonded carbon black particles.

This disclosure also provides a method for producing a polymer composite containing covalently bonded carbon black particles. The method involves forming a molten polylactic acid in a polymer extrusion apparatus at a first temperature and a first time; reacting the polylactic acid with carbon black particles in the presence of a catalyst at a second temperature and a second time to form an extrudate; and isolating the extrudate. The method uses carbon black particles that have surface functional groups selected from the group consisting of hydroxyl, thiol, amine, carboxylic acids, carboxylic anhydride, and quinone. The aforementioned functional groups form a reaction product with the polylactic acid that is an esterification reaction product or a transesterification reaction product. The extrudate obtained from the method may also have carbon black particles which are not covalently bonded to the polylactic acid. The carbon black particles of the method have diameters from 5 nm to 750 nm. The extrudate of the method may be molded into a plastic article.

BRIEF DESCRIPTION OF THE DRAWINGS

So that the manner in which the above recited features of the present disclosure can be understood in detail, a more particular description of the disclosure, briefly summarized above, may be had by reference to embodiments, some of which are illustrated in the appended drawings. It is to be noted, however, that the appended drawings illustrate only typical embodiments of the disclosure and are therefore not to be considered limiting of its scope, for the disclosure may admit to other equally effective embodiments.

DETAILED DESCRIPTION

The present disclosure provides compositions and methods involving polyester monomers, oligomers, and polymers that contain covalently bound carbon black particles. Advantageously, a polyester containing covalently bound CB particles may display improved CB filler/polymer homogeneity and physical properties such as coloration and tensile strength. The covalently bound CB particles of this invention may exhibit useful properties at a lower weight percent loading based on the polymer composite, and may further aid in the mixing, uptake, and homogeneous distribution of additional CB filler in a melt extrusion process.

Figure 1A:
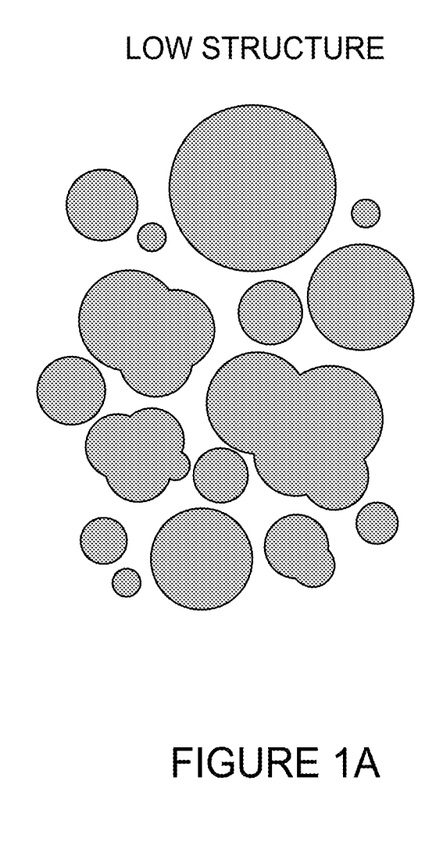
FIGS. 1A-1C illustrate some types of carbon black according to some embodiments of this disclosure.
Figure 1B:
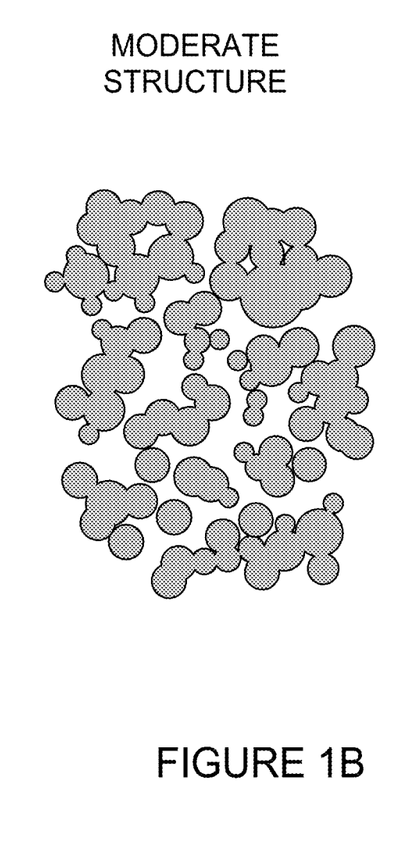
Figure 1C:
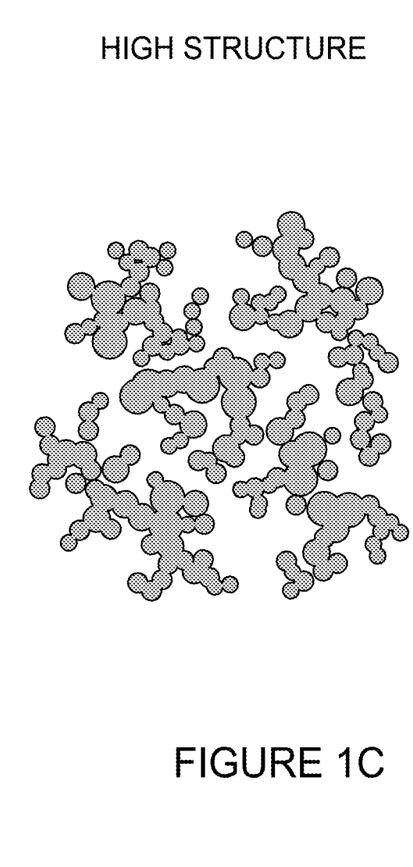

Carbon black (CB) is produced by the incomplete combustion of heavy petroleum products. Carbon black can be broadly defined as very fine particulate aggregates of carbon possessing an amorphous quasi-graphitic molecular structure. Carbon black surfaces may contain a variety of functional groups (e.g., amines, thiols, carbon oxides, and alcohols) depending on the synthesis of the CB, and/or post-treatments such as oxidation. Carbon black is available in a variety of shapes, sizes, surface structures, surface areas, and electrical conductivities. FIGS. 1A-1C show some possible CB particle structures: FIG. 1A shows singular or monodisperse structure; FIG. 1B shows moderate structure; and FIG. 1C shows high structure particles which may be filamentous in nature.

In a typical process involving the dispersion of CB particles in a polymer host, CB pellets are dispersed in a polymer melt via high shear mixing. A millimeter sized CB pellet may be used to facilitate the shipping, handling and safety of CB, instead of a difficult to handle and potentially toxic and combustible micron scale CB powder. When introduced into a polymer melt mixer or extruder, CB pellets are broken down in size and are initially transformed into smaller agglomerates, which may have micron to millimeter scale diameters. The sheer forces applied over time during the melt mixing process break apart the agglomerates, resulting in particles and particle aggregates with diameters from between about 50 nm to about 500 nm (submicron or nanoscale). Nanoscale CB particles are useful and may impart desirable coloration at low weight percent loadings, but may re-aggregate into larger agglomerates and create undesirable inhomogeneous regions in a polymer composite that compromises its tensile strength. Advantageously, in embodiments of this disclosure, polyester composites containing CB may also contain nanoscale CB particles covalently bound to polymer molecules with diameters of the CB particles and small aggregates between about 5 nm to about 750 nm. These composites may also exhibit less CB agglomerate formation, and feature improved coloration and tensile strength.

Figure 2:
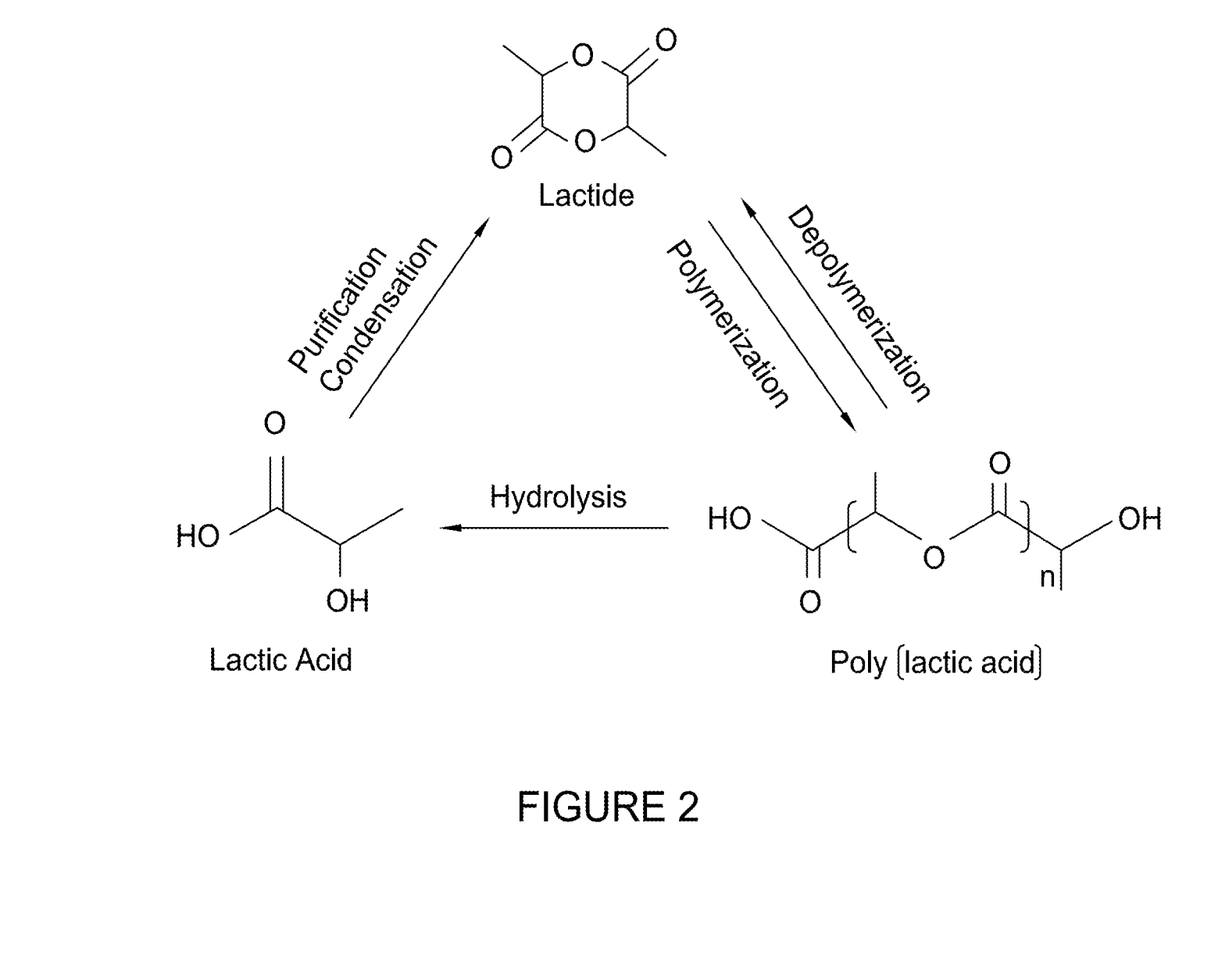
FIG. 2 illustrates some chemical reactions involving lactic acid according to some embodiments of this disclosure.

One polyester that benefits from covalently bound CB particles is polylactic acid (PLA). Polylactic acid is attractive industrially because it is biodegradable, biocompatible, and may be produced from renewable resources. As shown by FIG. 2, PLA may be produced from a ring opening polymerization (ROP) of a lactide. The lactide (3,6-dimethyl-1,4-dioxane-2,5-dione) may be produced from the condensation of two lactic acid molecules. A PLA produced from a lactide may have a side chain R group per repeat unit, such as a —$CH_3$ group (shown), and the side chain R group may be a chiral group. FIG. 2 also shows that PLA may biodegrade to the environmentally benign lactic acid under hydrolytic conditions.

Figure 3:
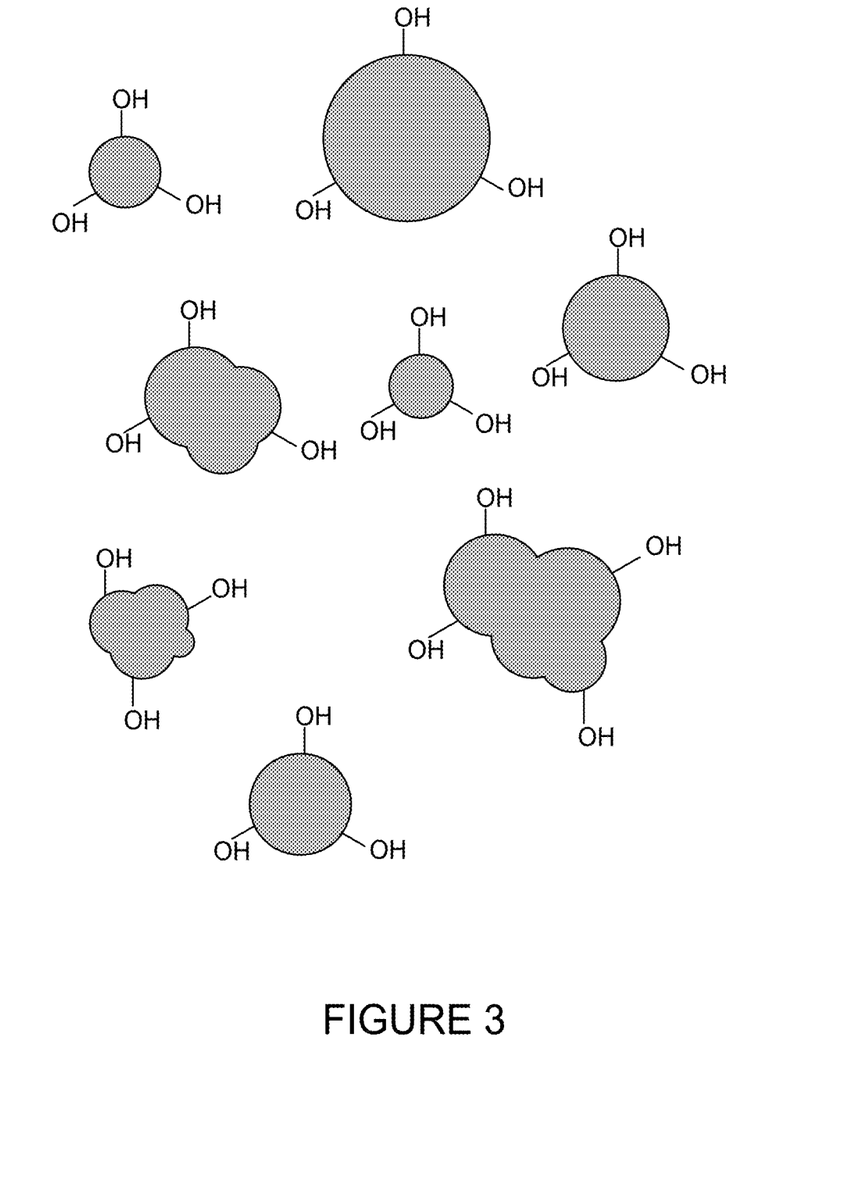
FIG. 3 illustrates carbon black particles with surface functional groups according to some embodiments of this disclosure.

In embodiments of this disclosure, PLA oligomers and polymers may be covalently attached or grafted onto the surface of CB particles that have surface functional groups, which react with other chemical groups to form a polyester, such as a PLA. In one embodiment, CB particles that contain surface hydroxyl groups (—OH) are used to produce a PLA by the ring opening of a lactide. FIG. 3 illustrates an example of a low structure hydroxyl functionalized CB particle that may be used in such a reaction, and FIG. 4 shows a CB particle surface with hydroxyl groups reacting with a lactide to produce a PLA, via a ring opening polymerization.

Figure 4:
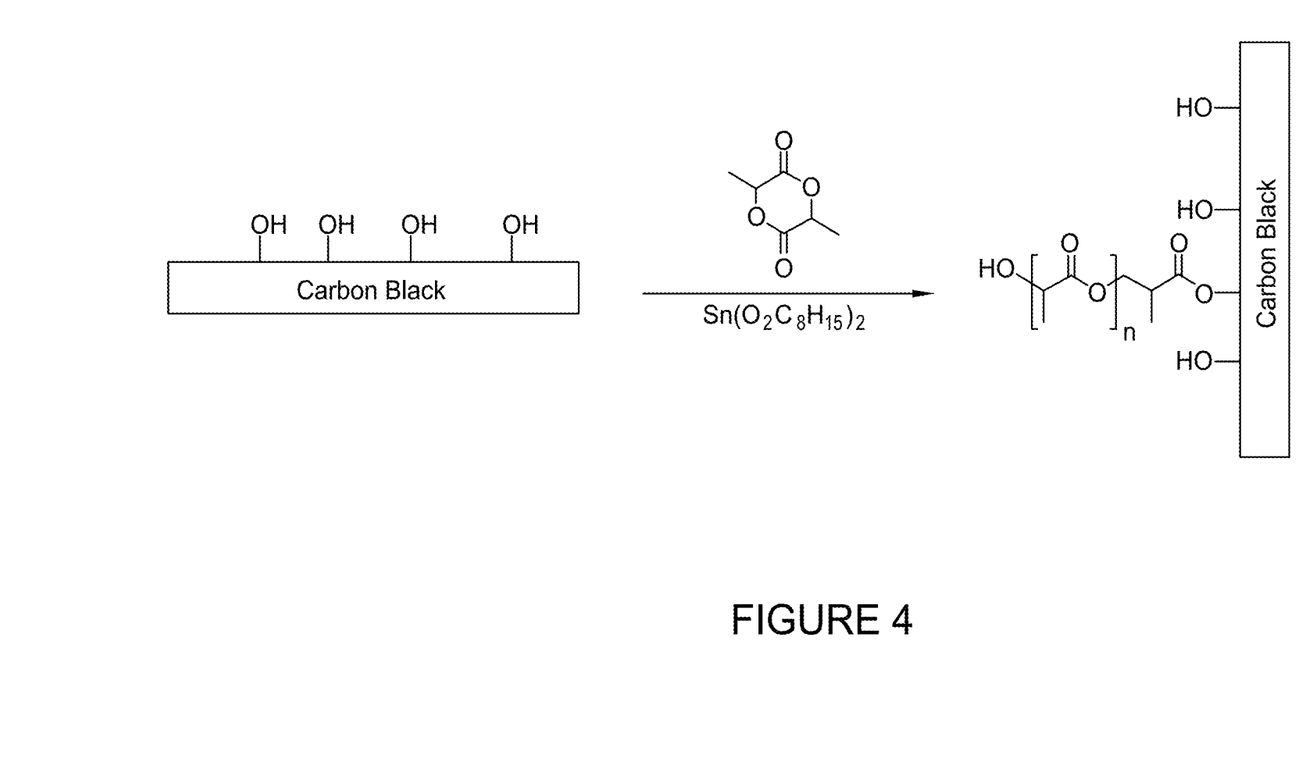
FIG. 4 illustrates a chemical reaction involving a lactide according to some embodiments of this disclosure.

The ROP of a lactide by nucleophilic CB hydroxyl groups, as illustrated in FIG. 4, may be performed in the presence of a catalyst, such as a Lewis acid, for example tin (II) octanoate, and/or by further heating the mixture in the polymer melt phase (e.g., reactive grafting and reactive extrusion). In an embodiment of this disclosure, a solution phase synthesis of CB covalently bound to a PLA may be performed as follows: a dry reaction vessel, padded with dry argon or nitrogen, is charged with a catalyst, such as 1,5,7-triazabicyclo[4.4.0]dec-5-ene (TBD) or tin(II) octanoate (0.20-1.0 mole %), and anhydrous dichloromethane. The mixture may then be added to a separate reaction vessel under similar dry and inert conditions that contains a lactide (1.0 mole equivalent lactide, D, L or a mixture of isomers) and an excess of carbon black (<1 mole equivalent surface hydroxyl groups). The mixture may then be mechanically stirred for about 24 hours, followed by quenching the reaction by adding an excess amount (>10 mole equivalents) of benzoic acid. The polymer may then be isolated by precipitation in methanol, and further purified further via Soxhlet extraction. The isolated solid polymer composite sample, containing CB particles covalently bonded to the polymer, may then be vacuum dried overnight and then analyzed for structure, purity, and thermal properties by methods such as nuclear magnetic resonance, size exclusion chromatography, and differential scanning calorimetry. We note that those skilled in the art may adjust the molar equivalent(s) of the reacting reagents to achieve a desired result, and herein we do not restrict the ratio of lactide to CB surface functional groups. For example, a greater molar equivalent or molar amount of CB surface hydroxyl groups (in comparison to lactide) may yield PLA polymer chains with a lower number average molecular weight ($M_n$). In contrast, a limiting molar equivalent of CB surface hydroxyl groups to lactide may create higher $M_n$ PLA.

In this disclosure we do not restrict the type of carbon black surface functional groups that may form a polyester or PLA material, or the mechanism by which the polyester is formed on the surface of a CB particle or material. For example, in an embodiment of this disclosure, a nucleophilic surface amine group (e.g., —$NH_2$) may be used to produce a PLA by the ring opening of a lactide. In another embodiment, a CB surface may have carboxyl or carboxylic acid groups, that participate in an esterification reaction, and thus grafts a polyester or a PLA to the CB surface by reaction with a polyester or PLA alcohol group. In a further embodiment, an electrophilic anhydride group may be produced on the surface of a CB particle using organic synthetic methods, and then reacted with nucleophilic sites (e.g., —OH end groups) on a PLA oligomer or polymer, and thus bond a PLA to the CB surface.

Figure 5:
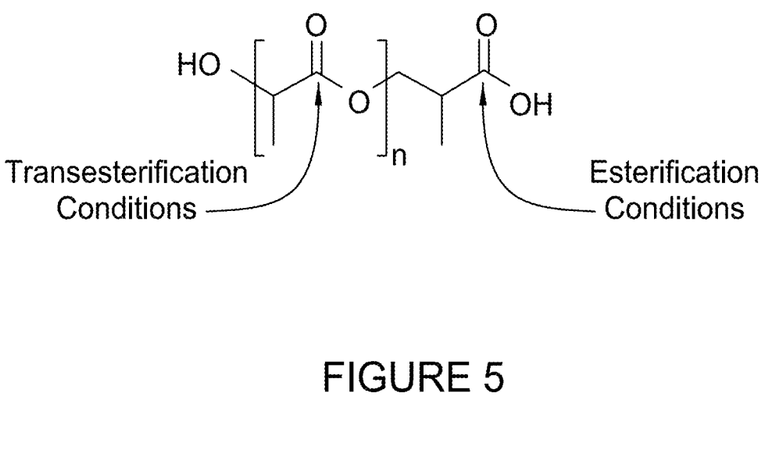
FIG. 5 illustrates molecular sites of chemical reactions according to some embodiments of this disclosure.
Figure 6:
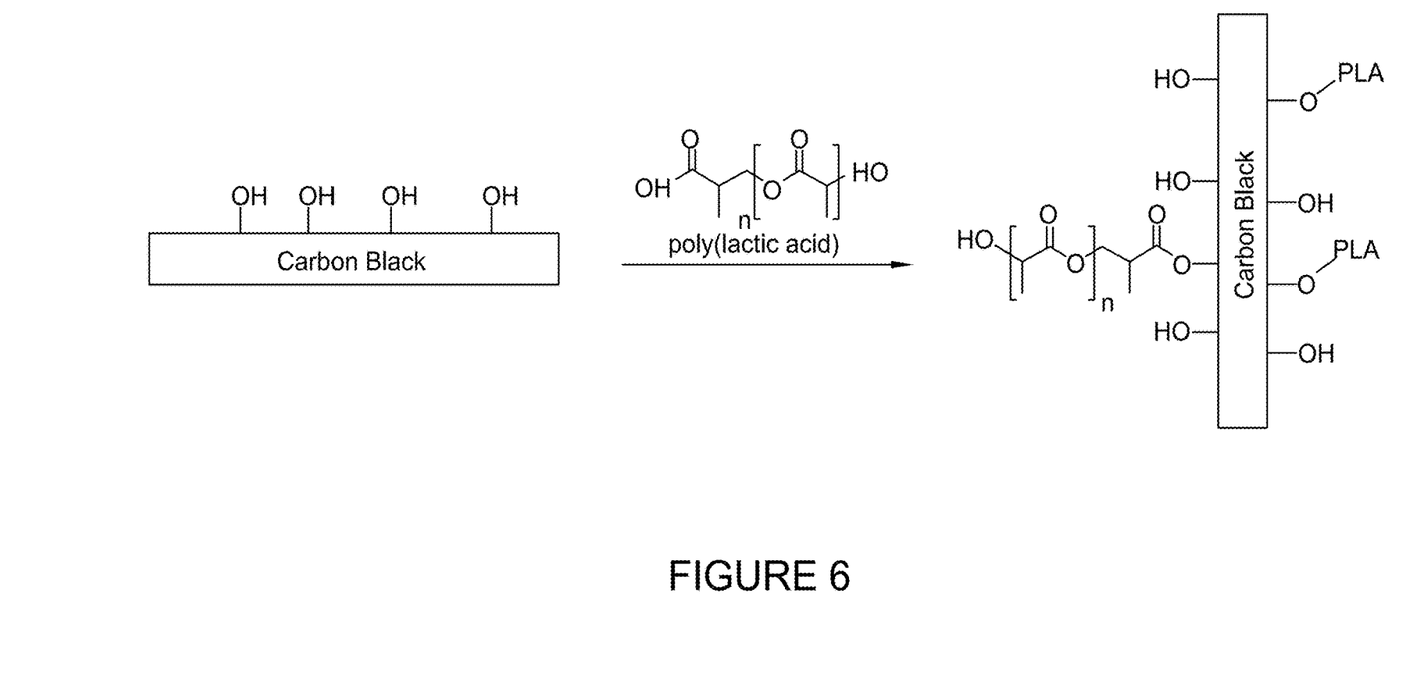
FIG. 6 illustrates an esterification chemical reaction according to some embodiments of this disclosure.

In other embodiments of this disclosure, a PLA oligomer or polymer may be grafted directly onto the surface of a CB particle, by either esterification or transesterification reactions. For example, an esterification reaction may occur at the site of a terminal carboxylic acid group under esterification conditions (acid or base catalysis), and a transesterification reaction may occur at a sterically hindered internal ester bond under transesterification conditions (acid or base catalysis and heating). The types of sites so described are shown in FIG. 5, and FIG. 6 illustrates the grafting of a PLA chain onto the surface of a CB particle under esterification conditions.

Figure 7:
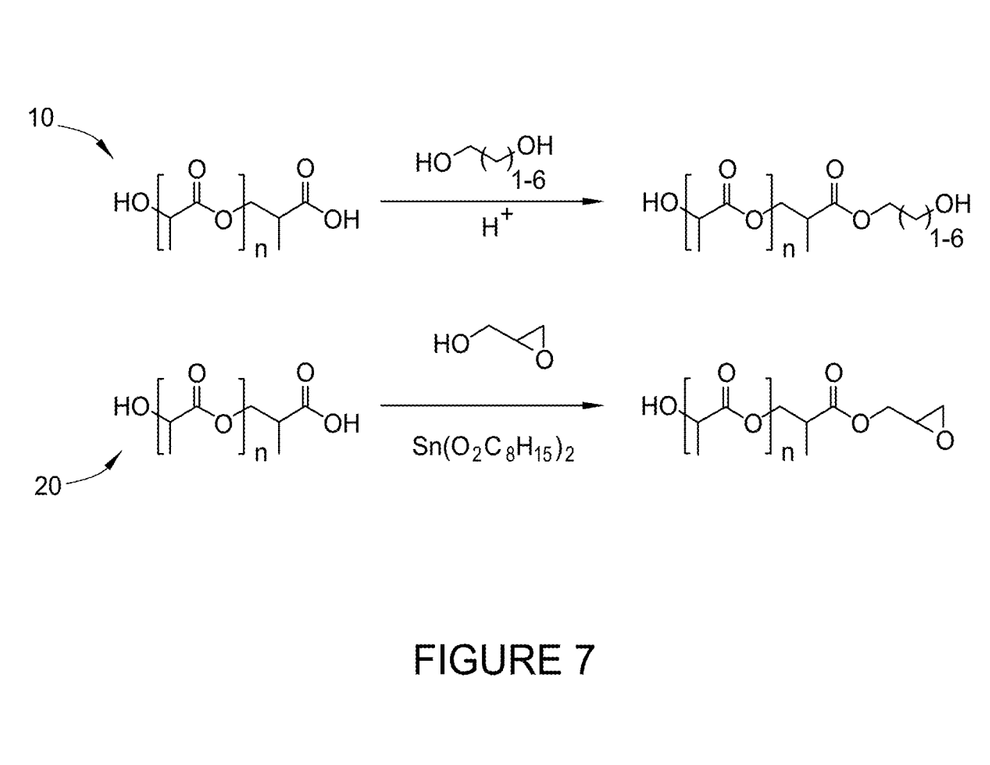
FIG. 7 illustrates chemical reactions according to some embodiments of this disclosure.

In further embodiments of this disclosure, a PLA can be end functionalized with either a terminal dihydroxy alkane such as ethylene glycol, or glycidol (an epoxide), to produce a PLA with end group(s) that will react with CB surface functional groups. FIG. 7 shows synthetic schemes 10 and 20 for two functional PLAs that may graft onto an appropriate functional CB surface: synthesis of a chain extended dihydroxy (telechelic) PLA that may undergo an esterification reaction with a functional CB surface at 10; and synthesis of an epoxide functional PLA, that may be grafted onto the surface of a CB particle containing a nucleophile, such as a primary amine group, at 20.

In some embodiments of this disclosure, a transesterification reaction between CB surface hydroxyl groups and a PLA is achieved by use of a catalyst, such as a mesoporous silica-anchored organotin material. In another embodiment, an esterification can be accomplished in solution (such as dimethylformamide (DMF)) using dicyclohexylcarbodiimide (DCC) and dimethlyaminopyridine (DMAP), or in the melt phase using a Lewis acid catalyst such as titanium isopropoxide. In some cases, functional CB may be added during a PLA polymerization, such as near the end of the polymerization, or just after the polymerization, in the presence of a Lewis acid catalyst such as a tin (II) catalyst, such as tin octanoate. This type of synthesis may be referred to as a "one-pot" synthesis of CB covalently bonded to a PLA. In this disclosure we do not restrict the order of addition of the reacting components, nor the technique by which these modifications are achieved, (e.g., solvent solution synthesis or reactive melt processing such as reactive grafting or extrusion), nor do we restrict the type of catalyst (s) used, such as Lewis acids, metal complexes, or basic compounds. The CB may be attached to any portion of the polymer structure, such as the polymer backbone or main chain in a pendant form, given the appropriate polymer functional group, or at the end of a polymer chain. Carbon black materials suitable for the production of polyesters containing covalently bounded CB, may be obtained from companies including the Cabot Corporation, USA and Continental Carbon, USA. Additional chemical reagents, such as lactides and other compounds and materials, may be obtained from Sigma-Aldrich of St. Louis, Mo., USA.

The production of PLA covalently bound to carbon black particles may be achieved by conducting synthetic reactions within a polymer extruder, such as extruders produced by Clextral of Firminy, France. Such a technique may be known as a reactive extrusion technique, and may utilize an extruder, such as co-rotating intermeshing twin screw extruder, as a continuous chemical reactor, wherein a PLA may be introduced, and wherein the PLA may subsequently undergo one or more chemical reaction(s) with at least one additive, such as a functional CB, during a polymer extrusion process. In some embodiments, a reactive extrusion process may involve the sequential addition of catalytic, reactive and/or inert (non-reactive) additives such as Lewis acids, metal complexes, basic compounds, small molecules, oligomers, polymers, free radical initiators, crosslinking agents, anti-oxidants, flame retardants, inert gases, coupling agents, and mineral fillers.

In embodiments of this disclosure, a PLA containing CB may undergo further chemical reactions with itself or other additives in a reactive extrusion process, which include, but are not restricted to: synthesis, decomposition, single replacement and double replacement, oxidation/reduction, acid/base, nucleophilic, electrophilic and radical substitutions, addition/elimination reactions, grafting and chain extension; and polymerization reactions such as condensation, step-growth, chain-growth and addition, acrylic free radical, cationic epoxy, Michael addition, ring-opening, and ring-forming or Diels-Alder polymerization types. A PLA material in a twin-screw extruder may be further contacted with an additive that may react with portions of a PLA material's macromolecular structure such as PLA chain ends, R groups and/or pendant groups, and/or the polymer backbone or main chain; and thus create a PLA with new groups that may be aliphatic, aromatic, mixtures thereof, and may have groups and/or structures that are linear, branched, and/or dendritic.

In some embodiments, the PLA may have reactive functional groups that may be at least monofunctional, and those multifunctional groups may serve as foci for crosslinking, and are therefore useful for tuning the materials modulus and hardness. In further embodiments of this disclosure, groups bonded to the polymer main backbone may be an aliphatic group, an aromatic group or combinations thereof, and may also contain sites of unsaturation such as double or triple bonds, or other functional groups that may undergo any number of reactions to produce new groups or polymeric segments. For example, in some embodiments, in addition to CB particles, oligomeric and polymeric groups or segments may be added to or grafted to a PLA by a reactive extrusion process, and include, but are not restricted to groups or materials selected from: polyamides, polycarbonates, polyesters, polyether ketones, polyethers, polyoxymethylenes, polyether sulfone, polyetherimides, polyimides, polyolefins, polysiloxanes, polysulfones, polyphenylenes, polyphenylene sulfides, polyurethanes, polystyrene, polyacrylonitriles, polyacrylates, polymethylmethacrylates, polyurethane acrylates, polyester acrylates, polyether acrylates, epoxy acrylates, polycarbonates, polyesters, melamines, polysulfones, polyvinyl materials, acrylonitrile butadiene styrene (ABS), copolymers derived from styrene, copolymers derived from butadiene, halogenated polymers, block copolymers and copolymers thereof. Examples of suitable free radical initiators that may be useful include azo compounds, and the inorganic and organic peroxides such as tert-butyl perbenzoate, dicumyl peroxide, benzoyl peroxide, and di-tert-butyl peroxide.

In some embodiments, other inert and/or reactive additives or process aids may be added to a reactive extrusion process involving a PLA and CB, and may include lubricants, nucleating agents, extension oils, organic and inorganic pigments, anti-oxidants and UV-protectors, flame retardants, inert gases, heat stabilizers, plasticizers, fillers, and coupling agents. For example, plasticizers such as dioctyl phthalate, dioctyl adipate, and triacetyl glycerol may be added to an extrusion process at a concentration between about 5 and about 30% wt. based on polymer. The plasticizers may be used to modify the thermal and mechanical properties of a PLA such as glass transition temperature ($T_g$), melting temperature ($T_m$), degree of crystallinity, and mechanical properties such as modulus. In further embodiments, other fillers may be co-mixed with PLAs as part of an extrusion process, and may be selected from the group including, but not restricted to: graphite, carbon fiber, carbonate minerals, magnesium carbonate, hydromagnesite, huntite, hydroxide minerals, aluminum trihydroxide, magnesium hydroxide, brucite, boehmite, bauxite, borates, flame retardant synergists, clays, organoclays, and oxides of antimony. In one embodiment, a CB filler may be added to the composite that is not covalently bonded to the PLA. The non-bonded CB filler may be used in addition to the covalently bonded CB filler in the composite, and in some embodiments, the covalently bonded CB filler may enhance and/or increase the uptake and dispersion of the non-bonded CB filler. In these embodiments the non-bonded CB filler may be added to a composite containing the covalently bonded CB in a zone of the extruder.

In other embodiments, coupling agents may be used in a PLA reactive extrusion process as plasticizers, reactive polymer modifying agents, and mineral filler surface modification agents. The coupling agent may modify the surface properties of the polymers so as to enhance mixing, lower friction, and/or increase chemical compatibility. Coupling agents may be selected from the group including but not restricted to: silanes, titanates, zirconates, aluminates, carboxylic acids, inorganic and organic esters, and phosphates. Many of these recited materials and chemical reagents are available from BASF of Ludwigshafen, Germany, Sigma- Aldrich of St. Louis, Mo., USA and Huntsman Advanced Materials, The Woodlands, Tex., USA.

In one embodiment, a CB modified PLA may be produced by a reactive extrusion process within an extruder zone. For example, a PLA or a PLA covalently bonded to CB may travel down the length of a first zone in a twin screw extruder in a molten state to a second or another zone that is fitted with additive injectors, ports or screws. During a residence time, or the time during which a mass and/or a volume of the molten PLA traverses the extruder, such as between about 1 minute and about 20 minutes, modification of the molten PLA and/or PLA covalently bonded to CB may be achieved by the addition of reactive additives (e.g., hydroxyl functionalized CB) to produce new polymer chemical groups or structures. In one embodiment, a pre-formed PLA may be first melted in a zone of an extruder, and then subsequently contacted with and/or reacted with a functional CB and an acid catalyst in another zone of the extruder, wherein a PLA containing covalently bonded CB is formed. In one embodiment, a PLA containing covalently bonded CB may undergo further processing before the extrudate is isolated, such as a de-volatilization phase, by-product removal, and/or catalyst neutralization in a zone. In most cases, the product or composite materials are processed in the extruder until the grafting reaction and by-product removal is complete. The reactive extrusion involving PLA and a functional CB material may also occur in parallel with screw extruder conventional functions such as solids conveying, melting, mixing, and melt pumping. An extruded CB modified PLA material (extrudate) may then be processed into an object or plastic article by any number of techniques including injection molding, blow molding, transfer molding, compression molding, rotational molding, stamping, machining, computer numerical control (CNC) machining, water jet cutting, laser cutting, and die cutting. In one example, a trim piece or bezel (plastic article), that is part of a computer server enclosure, may be molded from a black colored CB modified PLA.

While the foregoing is directed to embodiments of the present disclosure, other and further embodiments of the disclosure may be devised without departing from the basic scope thereof, and the scope thereof is determined by the claims that follow.

What is claimed is:

1. A method of producing a polymer composite comprising covalently bonded carbon black particles, comprising:
   forming a molten polylactic acid in a polymer extrusion apparatus at a first temperature and a first time;
   reacting the polylactic acid with carbon black particles in the presence of a catalyst at a second temperature and a second time to form an extrudate; and
   isolating the extrudate.

2. The method of claim 1, wherein the carbon black particles comprise surface functional groups.

3. The method of claim 1, wherein the carbon black particles comprise surface hydroxyl groups.

4. The method of claim 2, wherein the surface functional groups are selected from the group consisting of carboxylic acids, carboxylic anhydrides, and quinones.

5. The method of claim 2, wherein the surface functional groups form a reaction product with the polylactic acid.

6. The method of claim 5, wherein the reaction product is an esterification reaction product.

7. The method of claim 5, wherein the reaction product is a transesterification reaction product.

8. The method of claim 1, wherein the extrudate comprises carbon black particles which are not covalently bonded to the polylactic acid.

9. The method of claim 1, wherein the carbon black particles have diameters from 5 nm to 750 nm.

10. The method of claim 1, wherein the extrudate is molded into a plastic article.

11. A method of producing a polymer composite comprising covalently bonded carbon black particles, comprising:
    forming a molten polylactic acid in a polymer extrusion apparatus at a first temperature and a first time;
    reacting the polylactic acid with carbon black particles in the presence of a catalyst at a second temperature and a second time to form an extrudate, the carbon black particles comprising surface hydroxyl groups, wherein the surface hydroxyl groups form a reaction product with the polylactic acid; and
    isolating the extrudate.

12. The method of claim 11, wherein the reaction product is an esterification reaction product.

13. The method of claim 11, wherein the extrudate comprises carbon black particles which are not covalently bonded to the polylactic acid.

14. The method of claim 11, wherein the carbon black particles have diameters from 5 nm to 750 nm.

15. The method of claim 11, wherein the extrudate is molded into a plastic article.

16. A method of producing a polymer composite comprising covalently bonded carbon black particles, comprising:
    forming a molten polylactic acid in a polymer extrusion apparatus at a first temperature and a first time;
    reacting the polylactic acid with carbon black particles in the presence of a catalyst at a second temperature and a second time to form an extrudate, the carbon black particles comprising surface hydroxyl groups, wherein the surface hydroxyl groups form an esterification reaction product with the polylactic acid; and
    isolating the extrudate.

17. The method of claim 16, wherein the extrudate comprises carbon black particles which are not covalently bonded to the polylactic acid.

18. The method of claim 16, wherein the carbon black particles have diameters from 5 nm to 750 nm.

19. The method of claim 16, wherein the extrudate is molded into a plastic article.

* * * * *